Jan. 26, 1965  A. WOBIG  3,167,109
BURNER FOR LIQUID AND GASEOUS FUELS
Filed April 13, 1961  3 Sheets-Sheet 2
Fig.2
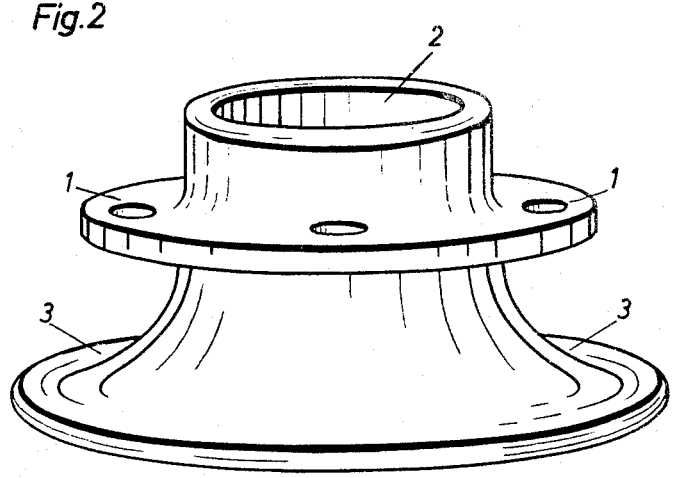
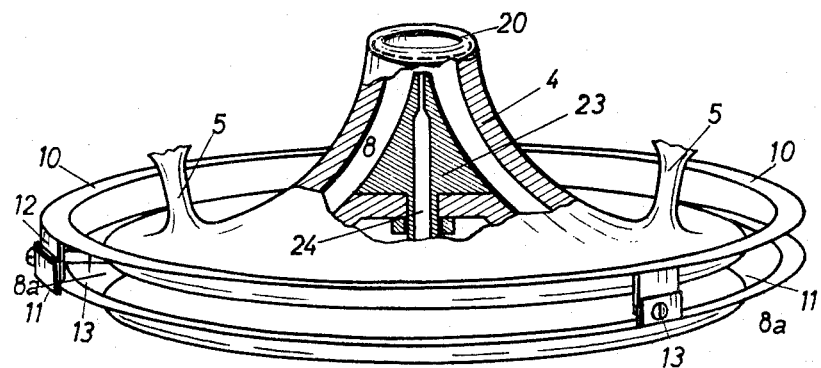
Inventor
Alberto Wobig
By Stevens Davis Miller & Mosher
Attorneys Jan. 26, 1965  A. WOBIG  3,167,109
BURNER FOR LIQUID AND GASEOUS FUELS
Filed April 13, 1961  3 Sheets-Sheet 3

Inventor
Alberto Wobig
By Stevens, Davis, Miller & Mosher
Attorneys 3,167,109
BURNER FOR LIQUID AND GASEOUS FUELS
Alberto Wobig, Luneburg, Germany, assignor to
Bodo Thyssen, Munich, Germany
Filed Apr. 13, 1961, Ser. No. 102,830
Claims priority, application Germany, Apr. 14, 1960,
W 27,667
4 Claims. (Cl. 158—73)

The invention relates to a burner for gaseous or liquid fuels.

It is generally usual to accelerate the combustion air in order to overcome boiler resistance and to bring larger quantities of air into the combustion chamber when the boiler is of smaller dimensions. Acceleration of the combustion air is generally effected by means of drum blowers, fan blowers or like mechanically driven apparatus. Since rotating or other mechanically moved parts are subjected to wear and generate noise, the latter being particularly undesirable for small plants for domestic heating, there is a need for burners in which acceleration of the air of combustion is achieved without moving parts.

Now, according to the invention, the aforementioned disadvantages can be overcome and further important advantages can be achieved by ionising the air of combustion and/or the fuel and accelerating them to the required speed of flow by means of electric potential differences.

It was found that, according to the invention, it is possible in this way to achieve a high efficiency which is comparable with the efficiencies of conventional blowers, and also the ionisation of the fuel considerably improves the ignition of the air and fuel mixture as well as the atomisation thereof. In other words, larger spacings can be chosen for the ignition electrodes, so that the certainty of ignition by way of the longer spark gaps is improved and failure because of pollution of the ignition electrodes is reduced. According to a preferred embodiment which will be described hereinafter, it is possible to recover the electrical energy for the ignition sparks from the no longer required charges in the air mixture after the latter has been accelerated.

Preferably, ionisation and a partial acceleration of the combustion air or the fuel is achieved by means of at least one spray electrode with a conductive surface having a tip or edge of very small radius of curvature pointing in the desired direction of flow of the air of combustion and/or the fuel.

In order to obtain a suitable quantity of air throughflow, it will generally be of advantage to make the spray electrode of strip or sheet form, or to make it from a metal foil so that the spray discharge is set up at an elongated edge. To support, or for smaller plants to replace, the strip-shaped electrodes, pointed electrodes may be used. For conventional high voltages, such as 10 to 40 kv., of course only a portion of the air molecules is ionised and accelerated in a direction away from the point or edge of the spray electrode. However, in practice it has been shown that at atmospheric pressure or a suitable higher pressure, the non-ionised air molecules are flung along in the direction in which the ionised particles are accelerated, because the free length of path of ions is in the vicinity of $10^{-5}$ cm., so that there will be a sufficiently large number of collisions between ionised and non-ionised particles whereby the latter are carried along.

According to a preferred embodiment, at least one accelerating electrode, having a larger potential difference than the spray electrode, is provided downstream spaced from the spray electrode. Preferably, the accelerating electrode has an insulated surface so that, with relatively small gaps between the electrodes and the resultant higher field strength, arcing between the electrodes can be avoided without resorting to special other means. If the accelerating electrode were to have a bare surface, resistances would have to be provided in the supply circuit for the electrodes so that the occurrence of sparking and arcing is avoided. However, this would considerably lower the total efficiency of the plant.

The insulated accelerating electrode or electrodes preferably surround the space into which the air of combustion and/or the fuel are blown.

Preferably, the spray electrode and the accelerating electrode or electrodes are connected to a high voltage transformer so that, upon each change of voltage, the alternating field breaks up the accumulation of static charges on the insulator of the accelerating electrode. Such operation with alternating current has the special advantage of avoiding the need for expensive high voltage rectifiers. For operating the burner according to the invention, it is sufficient to use a 2 x 5 kilovolt high voltage transformer such as that required for the ignition with conventional oil burners. For larger quantities of air throughput, it is, of course, possible to use transformers of 2 x 20 kilovolt or higher. Despite the applied alternating field, the air flow is accelerated in only one direction. The break-up of the main charges on the insulating layer of the accelerating electrodes prevents the accelerating effect from deteriorating and becoming indefinite.

Downstream from the scattering space there may be further accelerating stages. Each of these accelerating stages consists of at least one spray electrode and at least one insulated accelerating electrode. The accelerating stages could comprise a plurality of insulated accelerating electrodes of which at least one has a larger potential difference than the others. The spacing between the accelerating stages should be larger than the distance between the individual accelerating electrodes of each accelerating stage so that the fields extending from one accelerating stage to the other against the direction of flow may be kept small.

According to a preferred embodiment of the burner according to the invention, at least a portion of the accelerated air is used for drawing in and/or atomising the fuel. This is very easily possible because, even if only a single arrangement comprising one spray electrode and one accelerating electrode is used, air velocities can be obtained which produce the required vacuum at the suction opening for the fuel.

Preferably, the spray edges of the spray electrode or electrodes are directed on to a common point or line of combustion so that an increase in the density of the charge in the air stream is obtained downstream from the spray electrodes. The increase in the density of the charge in the airstream can be supplemented by suitably shaped conductors for the air stream. For the same purpose, the air stream may be diverted by means of electric fields.

According to the aforementioned preferred embodiment, the quantity of the charge in the air stream can be partially recovered and utilised for igniting the fuel-air mixture. In this case, one of the ignition electrodes preferably catches the charges of the ionised air stream. Ignition of the fuel-air mixture then takes place by discharging this electrode to an earthed counter electrode.

Preferably, the one ignition electrode is located in the center of the air stream of combustion. The other ignition electrode is annular or tubular and arranged concentrically with the first-mentioned ignition electrode. By suitable choice of size and arrangement of the ignition electrode or by including at least one capacitor, the capacity of the ignition electrode can be kept so large that, taking into account the spacing from the other ignition electrode, ignition sparking can be set up by means of the self-charging of the ignition electrode in the ionised air stream. Obviously, and especially for smaller devices in which the recovery of the density of the charge of the ionised air stream is insufficient for ignition, a suitable additional voltage may be applied to the two ignition electrodes. This presents no difficulties because high voltage is available from the high tension transformer. However, in this case the burner according to the invention has the advantage that, as already mentioned, ignition in the ionised air stream takes place much better than in a non-ionised air stream. With an alternating current supply, rectifiers may be provided which effect positive or negative charging of the ignition electrode from the air stream. Charging of the ignition electrode can be supported by further collecting electrodes or grids located upstream or downstream.

Preferably, the fuel nozzle which introduces the fuel into the accelerated air stream is in the form of a spray electrode.

According to a specially preferred embodiment, there is provided a frusto-conical or screen-shaped guide member of insulating material, preferably ceramic or porcelain, in the bottom edge of which there is embedded the annular accelerating electrode. At a spacing from the bottom edge of the guide member, there is arranged the annular spray electrode the smaller edge of which relatively to the axis of symmetry of the guide member is angular. Several guide members may be arranged one above the other in a roof-like construction so that a passage remains free between each pair of guide members for the combustion air or the fuel. The passages open into a common orifice. Preferably, the guide members are rotationally symmetrical. The suction openings of the passage extend radially while the passage orifices extend axially.

According to a further preferred embodiment, a flame-stabilizing electrode is arranged in the vicinity of the burner tube nozzle, such electrode holding the root of the flame to the burner tube nozzle by virtue of its potential relatively to the ions in the flame.

The accompanying drawings illustrate preferred embodiments of the invention.

In the drawings:

FIG. 2 is a perspective exploded view of the burner according to FIG. 1, but slightly modified;

Figure 1:
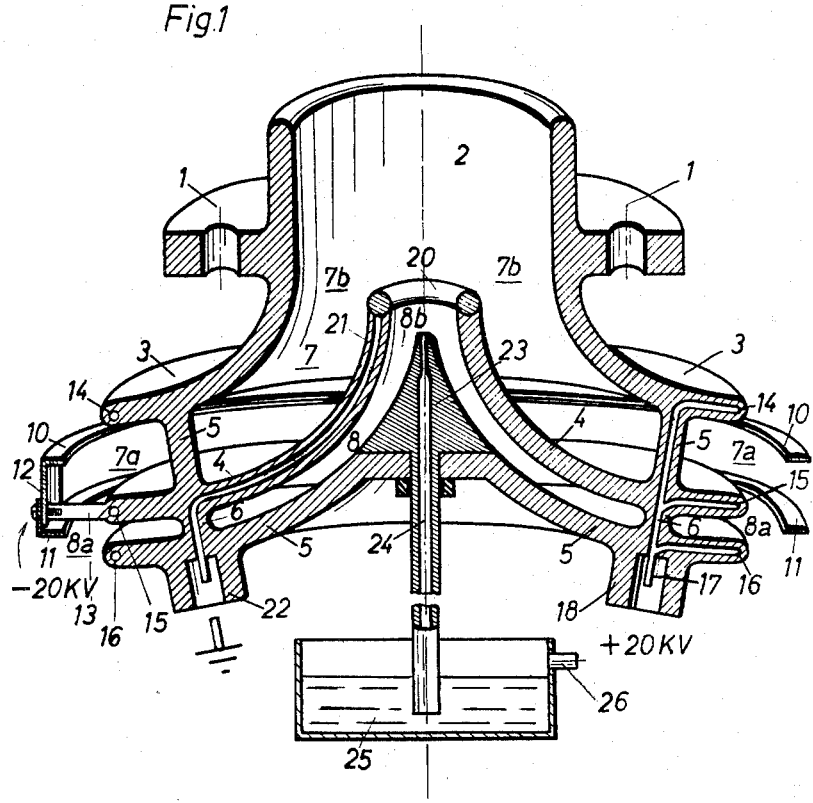
FIG. 1 is a diagrammatic cross-section of a preferred embodiment of an oil burner according to the invention.

In the FIG. 1 embodiment, there is provided a guide member of ceramic or porcelain comprising a connecting flange 1 for connecting the burner to, say, the door of a kiln, a burner tube nozzle 2, an umbrella-like curved first guide wall 3, a similarly curved guide wall 4 and a further guide wall 5. Between the guide wall 3 and the guide wall 4, supports 5' are arranged, for example, at angular spacings of 120° and between the guide wall 4 and the guide wall 5 there are like supports 6 for maintaining a spacing.

Thus, the guide member is rotationally symmetrical. It comprises an annular gap 7 between the guide walls 3 and 4, such gap opening into space with a radial suction opening 7a and into the burner tube nozzle 2 by means of an axial discharge opening 7b. The guide member further comprises a narrower annular gap 8 between the guide walls 4 and 5, this similarly opening into free space with a radial suction opening 8a and into the burner tube nozzle 2 with an axial discharge opening 8b.

At a spacing from each suction opening 7a and 8a there is a bare electrode ring 10 and 11, respectively, the narrow edge of each of which is pointed towards the respective suction openings 7a and 8a. These electrode rings constitute the spray electrodes. They are preferably made of tungsten or rhenium foil. The spray electrodes 10 and 11 are interconnected by means of brackets 12 which may, for example, be provided at angular spacings of 120°. They are held to the guide member by means of ceramic spacers 13.

In each marginal bead of the guide walls 3, 4 and 5, is embedded a wire ring 14, 15 and 16, respectively, which are connected to a terminal 18 for high voltage by means of a common conductor 17 extending through one of the supports 5 and 6. The wire rings 14, 15 and 16 accordingly form insulated accelerating electrodes which cooperate with the spray electrodes 10 and 11. The spray electrodes 10 and 11 have a large potential difference with the accelerating electrodes 14, 15 and 16, for example 10 kilovolts.

On that annular bead of the guide wall 4 which opens into the burner tube nozzle 2, there is seated a metal ring 20 which is earthed through a conductor 21 and a terminal 22.

On the guide wall 5 there is seated a conical metal member 23 having a bore 24 for supplying the fuel, for example oil. The oil is sucked from a reservoir 25 which preferably keeps it under pressure through a supply line 26.

The operation of the burner illustrated in FIG. 1 is as follows:

One terminal of a high tension transformer is connected to the spray electrodes 10 and 11 and the other terminal is connected to the terminal 18 for the accelerating electrodes 14, 15 and 16. The earthed central tapping of the high tension transformer is connected to the terminal 22.

Since the field density is extremely high at the narrow edges of the spray electrodes 10 and 11, for example $10^7$ volts per centimeter, electrons are emitted from the edges of the spray electrodes 10 and 11 during a half wave of the applied alternating voltage. During the other half wave, electrons are drawn in from the surrounding air, the ionised air molecules being driven off from these edges of the spray electrodes 10 and 11 during both half waves. The ionised air molecules take along the non-ionised molecules so that, in accordance with the electric wind principle, an intensive air stream is radiated from the spray electrodes 10 and 11 towards the suction openings 7a and 8a. This air stream is strongly accelerated by the insulated accelerating electrodes 14, 15 and 16. By a suitable choice of the spacing of the spray electrodes 10 and 11 from the accelerating electrodes 14, 15 and 16 and by reason of the fact that each spray electrode is faced by two accelerating electrodes arranged symmetrically to the direction of acceleration, the major portion of the ionised gas molecules and the carried along non-ionised gas molecules are not diverted from the accelerating electrodes 14, 15 and 16 but are driven into the annular gaps 7 and 8, respectively.

A stronger air stream which draws in the fuel out of the bore 24 and atomizes it, discharges from the discharge opening 8b of the annular space 8. A portion of the ionised gas molecules gives its charge to the metal member 23. During operation of the burner with direct current, the metallic member 23 will accordingly be charged positively or negatively. When the charging is sufficiently large, sparking to the metallic ring 20 is set up. This sparking is further facilitated by the remaining ions in the fuel-air mixture. Another strong air stream which supplies the required air of combustion leaves through the discharge opening 7b. During operation with alternating current, suitable rectifiers may be included between the metallic ring 20 and the metallic member 23, these rectifiers ensuring charging of the metallic member 23 in one sense by means of the continuous reversal of polarity.

Thus, in the FIG. 1 embodiment the metallic member 23 and the metallic ring 20 serve as ignition electrodes. However, the metallic member 23 also serves as an additional spray electrode by virtue of its potential difference to the metallic ring 20, the metallic ring 20 then assuming the function of an accelerating electrode. This ensures a particularly advantageous swirling of the atomised fuel with the atomising air leaving the discharge opening 8b and with the air of combustion leaving the discharge opening 7b.

In the FIG. 1 embodiment, a velocity of the combustion air of over 20 meters per second, and an air throughput of about 200 cubic meters per hour can, for example, be obtained with a diameter for the spray electrodes 10 and 11 of about 15 cm., and an operating voltage of 2 x 5 kilovolts. The total current consumption of the burner amounts to 16 watts. The air throughput is sufficient to burn about 10 kg. of heating oil per hour. The total height of the burner amounted to about 10 cm. The resultant velocity of the air stream and the air throughput quantity principally depend on the spacing between the spray electrodes and the accelerating electrode, the radius of curvature of the spray edge of the spray electrode and the applied voltage. The radius of curvature of the spray electrode should not, however, be chosen too small because if the surface field strengths are too high, the material may erode. Accordingly, it is of particular advantage if the spray electrode is in the shape of a strip or a foil of uniform thickness because this permits an increase in the radius of curvature of the spray edge of the spray electrode upon wear. If insulation breakdown ruptures are avoided, the burner operates noiselessly. These advantages make the burner particularly suitable as a miniature burner, for example for heating stoves placed in a kitchen where there is usually insufficient space to apply to the stoves the conventional long burner tubes with blowers.

In the FIG. 2 embodiment, the metallic ring 20 was embedded in the guide wall 4 in an insulated condition, so that an insulated accelerating electrode faces the metallic member 23 serving as a spray electrode.

Figure 3:
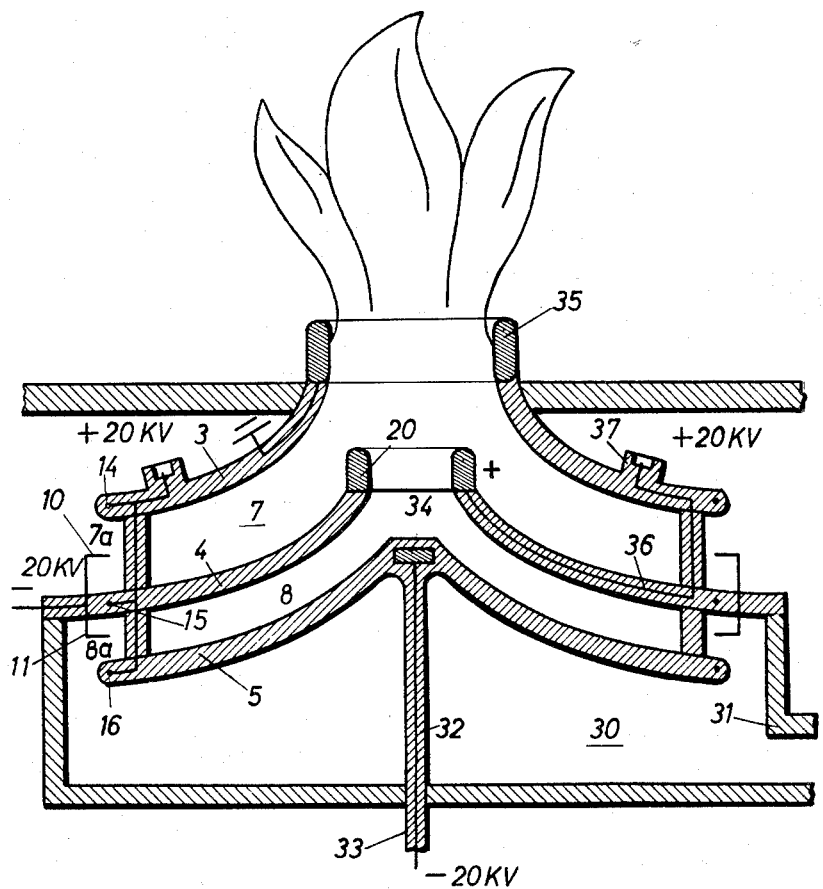
FIG. 3 is a section through a gas burner according to the invention.

FIG. 3 is a diagrammatic illustration of a gas burner constructed in a manner similar to the oil burner described in conjunction with FIGS. 1 and 2.

A gas such as natural gas is introduced into a vessel 30 through a connection 31. The screen-shaped guide wall 5 is held by an insulating rod 32 containing a conductor 33. The conductor 33 leads to a metallic member 34 embedded in an insulating manner in the tip of the guide wall 5. The upper side of the vessel 30 is formed by the guide wall 4.

The gas in the vessel 30 is driven through the spray electrode ring 11 into the suction opening 8a of the annular gap 8 whilst the accelerating electrodes 15 and 16 ensure suitable acceleration of the gas. The spray electrode ring 10 drives the surrounding air into the suction opening 7a of the annular gap 7, suitable acceleration of the air stream being achieved by means of the accelerating electrodes 14 and 15.

A metallic ring 35 constitutes the burner nozzle and is seated on the marginal bead of the guide wall 3. Thus, in this construction the accelerating stages constituted by the spray electrodes 10, 11 and the accelerating electrodes 14, 15, 16 are followed downstream by a further accelerating stage which is formed by the insulated electrode 34 and the bare metallic ring 20. Accordingly, one terminal of the high voltage source is connected to the conductor 33. Connection of the metallic ring 20 to the other terminal of the high voltage source is effected through the conductor 36 in the guide wall 4 and through a connecting plug 37. The metallic ring 20 also serves as one of the ignition electrodes and to collect the charge carriers in the ionised gas. The other ignition electrode is formed by the earthed metal ring 35.

I claim:

1. A burner for liquid and gaseous fuels comprising at least one spray electrode, at least one accelerating electrode mounted in spaced relationship to said spray electrode, a layer of insulating material on the surface of said accelerating electrode, an alternating current source, means connecting said spray electrode and said accelerating electrode to said alternating current source and providing a high potential between said electrodes and generating an airstream by the electric wind effect of the spray electrode and means to introduce fuel into said airstream.

2. A burner for liquid and gaseous fuels comprising a casing having at least one air inlet slot, a burner tube nozzle arranged to provide an outlet from said casing, means defining at least one air passage between the air inlet slot and the burner tube nozzle, a fuel source, means to introduce fuel from said source into said passage, a thin conductive strip mounted adjacent and parallel to the length of said slot, said strip constituting a spray electrode, at least one accelerating electrode mounted in said casing in spaced relation to said conductive strip, an alternating current source, and means connecting said conductive strip and said accelerating electrode to said alternating current source and providing a voltage of predetermined value between the strip and the accelerating electrode.

3. A burner for liquid and gaseous fuels comprising a frusto-conical casing contiguous with and tapering towards a burner nozzle coaxial with the casing, the casing having an annular peripheral air inlet slot coaxial with and remote from the burner nozzle, means defining at least one air passage between the air inlet slot and the burner nozzle, a fuel source, means to introduce fuel from the source into the passage, a thin conductive strip of annular shape mounted adjacent to and coaxial with the annular slot, said strip having an edge of a predetermined radius of curvature, at least one accelerating electrode mounted in said casing in spaced relationship to said strip, an alternating current source, and means connecting said conductive strip and said accelerating electrode to said alternating current source and providing a voltage of a predetermined value between the strip and the accelerating electrode, wherein the said predetermined radius of curvature and the said predetermined potential are chosen in conjunction with each other so that an electric air stream is caused to flow away from the edge of the strip.

4. The burner of claim 2, comprising an insulating member arranged to surround said accelerating electrode.

References Cited by the Examiner
UNITED STATES PATENTS 1,854,475   4/32   Littlefield.

JAMES W. WESTHAVER, *Primary Examiner.*
FREDERICK KETTERER, PERCY L. PATRICK, ROBERT A. O'LEARY, *Examiners.*